United States Patent [19]

Miyoshi et al.

[11] 4,357,434
[45] Nov. 2, 1982

[54] STABILIZED HALOGEN-CONTAINING RESIN COMPOSITIONS

[75] Inventors: Takeshi Miyoshi, Fujisawa; Koji Takeuchi, Yokohama; Tatsuo Nukui, Yono; Hidetaka Oshida, Toda, all of Japan

[73] Assignee: Ajinomoto Company Incorporated, Tokyo, Japan

[21] Appl. No.: 244,111

[22] Filed: Mar. 16, 1981

[51] Int. Cl.$^3$ .............................................. C08K 5/57
[52] U.S. Cl. .................................. 524/178; 524/285; 524/368; 524/381
[58] Field of Search ................... 260/45.75 T, 45.8 A, 260/45.85 H, 45.85 T, 45.95 N

[56] References Cited

U.S. PATENT DOCUMENTS 3,063,963 11/1962 Wooten et al. .............. 260/45.75 T

FOREIGN PATENT DOCUMENTS 2446285 4/1975 Fed. Rep. of Germany .
47-30612 11/1972 Japan .
50-60543 5/1975 Japan .

Primary Examiner—V. P. Hoke
Attorney, Agent, or Firm—Oblon, Fisher, Spivak, McClelland & Maier

[57] ABSTRACT

Stabilized halogen-containing resin compositions comprising a halogen-containing resin, at least one organo tetravelent tin stabilizer selected from the group consisting of an alkyl tin laurate and an alkyl tin maleate and as a stabilizer assistant a hydroxymercaptan compound having the following the general formula

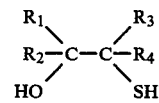

wherein $R_1$, $R_2$, $R_3$ and $R_4$ are the same or different and are each hydrogen atom, substituted or unsubstituted alkyl, alkenyl, aryl, cycloalkyl, hydroxyalkyl, alkoxyalkyl, carboalkoxyalkyl, epoxyalkyl or epoxyalkenyl, with the proviso $R_1$ and $R_3$ may form a ring together.

7 Claims, No Drawings

STABILIZED HALOGEN-CONTAINING RESIN COMPOSITIONS

BACKGROUND OF THE INVENTION

The present invention relates to halogen-containing resin compositions having excellent long-term thermal stability.

It is known that when halogen-containing resins, including polyvinyl halide and halogenated polyolefin, are subjected to light or to elevated temperature during or after compounding or processing, they can undergo a marked change in colour and transparency and become brittle owing to the occurrence of a decomposition reaction which is mainly attributable to the release of hydrogen halide.

Various stabilizers have been proposed for preventing such deterioration. Although zinc, lead, alkaline earth metal or organo tin stabilizers have been mainly employed, each of these stabilizers is not sufficient in long-term thermal stability. Among organo tetravalent tin stabilizers, particularly alkyl tin laurate and alkyl tin maleate stabilizers have been recognized as imparting excellent transparency to the end product made from halogen-containing resins. However, they are of high cost and are heavy metal stabilizers which are toxic, and hence it has become increasingly desirable to reduce the amount to be incorporated of in the halogen-containing resin from the standpoint of economical and social aspects.

SUMMARY OF THE INVENTION

An object of the present invention is to provide a new class of stabilizer assistant which greatly improves initial discolouration and thermal stability of alkyl tin laurate or alkyl tin maleate stabilizers for halogen-containing resin and which allows for the more efficient utilization of said organo tetravalent tin stabilizers.

It has now been found that there may be prepared halogen-containing resin compositions having excellent long-term thermal stability and transparency and good processing property when an alkyl tin laurate or an alkyl tin maleate stabilizer is incorporated in a halogen containing resin in combination with a hydroxy-mercaptan compound having the following general formula (I)

$$\begin{array}{c} R_1 \\ \diagdown \\ R_2-C-C-R_4 \\ \diagup \quad \diagdown \\ HO \qquad SH \end{array} \qquad R_3 \qquad (I)$$

wherein $R_1$, $R_2$, $R_3$ and $R_4$ are the same or different and are each hydrogen atom, substituted or unsubstituted alkyl, alkenyl, aryl, cycloalkyl, hydroxyalkyl, alkoxyalkyl, carboalkoxyalkyl, epoxyalkyl or epoxyalkenyl radical with the proviso that $R_1$ and $R_3$ may form a ring together.

Substituted or unsubstituted alkyl radicals and substituted or unsubstituted alkenyl radicals which may be represented by $R_1$, $R_2$, $R_3$ and $R_4$ may be those having 1 to 28 carbon atoms. Also, aryl radicals may be those having 6 to 12 carbon atoms such as phenyl, tolyl, xylyl, biphenyl and naphthyl radicals. Cycloalkyl radicals such as cyclohexyl and cycloheptyl are suitable.

Examples of hydroxyalkyl radicals include hydroxypropyl, hydroxybutyl and hydroxyhexyl.

Examples of alkoxyalkyl radicals include methoxybutyl, ethoxylhexyl and ethoxyoctyl.

Examples of carboalkoxyalkyl radical are acetoxybutyl and propioxyhexyl.

Examples of epoxyalkyl and epoxyalkenyl radicals include epoxyhexyl, epoxyoctyl and epoxyoctenyl.

Although an attempt has been made to improve the initial discolouration of metal soap stabilizers by combination with the hydroxymercaptan compound of the general formula (I) (see Japan KOKAI 50-60548), this stabilizer system is not necessarily suitable for practical application where long-term thermal stability and high level of transparency are required. Also, no appreciable improved effect in initial discolouration and thermal stability is achieved even by employing organo tin sulfur-containing compounds such as dibutyl tin s,s'-bis-(isooctylmercaptide acetate) and dioctyl tin s,s'-bis-(isooctylmercaptide acetate), which are similar organo tin stabilizers, in combination with the hydroxymercaptan compound of the general formula (I). Quite unexpectedly, however, it has been found that the hydroxymercaptan compound of formula (I) greatly improves the initial discolouration and thermal stability of alkyl tin laurate or alkyl tin maleate stabilizers.

The alkyl tin laurate and alkyl tin maleate stabilizers which are particularly effective in combination with hydroxymercaptan compounds may be those having 1 to 8 carbon atoms in alkyl substituent. Typical examples of suitable organo tetravalent tin stabilizers are dimethyl tin dilaurate, dibutyl tin dilaurate, diheptyl tin dilaurate, dihexyl tin dilaurate, dioctyl tin dilaurate, dibutyl tin maleate, polymer of dioctyl tin maleate, butyl tin trimethylmaleate, butyl tin trioctylmaleate, dibutyl tin laurate methylmaleate, dibutyl tin dioctylmaleate, tributyl tin octylmaleate and the like.

The hydroxymercaptan compound of the general formula (I) which may be incorporated in a halogen-containing resin together with an alkyl tin laurate or/and an alkyl tin maleate may be readily prepared by the addition reaction of an epoxy compound and hydrogen sulfide as disclosed in, for example, Japan KOKAI Nos. 47-30612 and 50-60548.

Typical examples of hydroxymercaptan compounds for use in the present invention as well as their corresponding raw material epoxy compounds are shown in Table 1.

| Hydroxymercaptan compound | Raw material epoxy compound |
|---|---|
| No. 1 $CH_2CH-CH_2O-\langle\bigcirc\rangle-\underset{\underset{CH_3}{\mid}}{\overset{\overset{CH_3}{\mid}}{C}}-\langle\bigcirc\rangle-OCH_2-CH-CH_2$ <br> $\phantom{No. 1 }\overset{\mid}{SH}\ \overset{\mid}{OH}\ \phantom{CH_2O-\langle\bigcirc\rangle-C-\langle\bigcirc\rangle-OCH_2-CH-}\overset{\mid}{OH}\ \overset{\mid}{SH}$ | $CH_2\overset{\diagdown}{\underset{O}{\diagup}}CH-CH_2O-\langle\bigcirc\rangle-\underset{\underset{CH_3}{\mid}}{\overset{\overset{CH_3}{\mid}}{C}}-\langle\bigcirc\rangle-OCH_2-CH\overset{\diagdown}{\underset{O}{\diagup}}CH_2$ |

| Hydroxymercaptan compound | Raw material epoxy compound |
|---|---|
| No. 2 ![structure] HO-C6H10(H)(OH)(SH)-CH(OH)-CH2(SH) | epoxy-C6H10(H)-CH—CH2 (epoxide) |
| No. 3 HO-C6H10(H)(SH)-CH2OC(=O)-C6H10(H)(OH)(SH) | epoxy-C6H10(H)-CH2OC(=O)-C6H10(H)-epoxy |
| No. 4 C11H23OCH2CH(OH)—CH2(SH) | C11H23OCH2CH—CH2 (epoxide) |
| No. 5 HO-C6H9(H)(CH3)(SH)-CH2OC(=O)-(CH2)4-C(=O)OCH2-C6H9(H)(CH3)(OH)(SH) | epoxy-C6H9(H)(CH3)-CH2OC(=O)-(CH2)4-C(=O)OCH2-C6H9(H)(CH3)-epoxy |

Examples of halogen-containing resins which may be stabilized with the stabilizer composition comprising an alkyl tin laurate and/or an alkyl tin maleate stabilizer and stabilizer assistant of hydroxymercaptan compounds include polyvinyl halide: polyvinylidene halide: a copolymer of vinyl halide and vinylidene halide: a copolymer of vinyl halide and ethylene: a copolymer of vinyl halide or vinylidene halide with another unsaturated monomer copolymerizable therewith, for example the vinyl esters of carboxylic acids such as vinyl acetate, vinyl propionate, vinyl butyrate and vinyl benzoate; esters of unsaturated acids such as methyl, ethyl, propyl, butyl and allyl esters of acrylic acid and the corresponding esters of methacrylic acid; vinyl aromatic compounds such as styrene; esters of $\alpha,\beta$-unsaturated carboxylic acids such as methyl, ethyl, propyl and octyl esters of maleic, crotonic, itaconic and fumaric acids: halogenated polyolefins e.g. chlorinated polyethylene and chlorinated polypropylene: and polyolefins containing a very small amount of halogenide catalyst as impurity. Preferably the halides referred to in this present paragraph are chlorides.

In the compounding of the stabilized halogen-containing resins, a stabilizer of an alkyl tin laurate and/or an alkyl tin maleate and stabilizer assistant of hydroxymercaptan compound are ordinarily incorporated in the halogen-containing resins together with the necessary plasticizers by suitable milling techniques, and then the resulting composition is processed at an elevated temperature, for example, within the range from 150° C. to 200° C. on hot rolls or in a heated mixer.

The amount of an alkyl tin laurate and/or an alkyl tin maleate stabilizer used in the present invention may be 0.5 to 5.0 parts by weight, per 100 parts of halogen-containing resins. Also, the amount of a hydroxymercaptan compound which may be employed as stabilizer assistant in the present invention may be 0.01 to 5.0 parts by weight, preferably 0.1 to 1.0 parts by weight per 100 parts of the halogen-containing resins.

With the halogen-containing resins, there may be incorporated other metal stabilizers, plasticizers, epoxy stabilizer, organic chelates, pigments, fillers, blowing agents, anti-static agents, anti-clouding agents, plate-out preventing agents, surface treating agents, lubricants, antioxidants, anti-flaming agents, light stabilizers and ultraviolet absorption agents.

The stabilized compositions of this invention are useful in the manufacture of mouldings, extrusions, sheets, films, coatings and similar articles.

In the following Examples, which are further illustrative of the present invention, all parts referred to are by weight. Interspersed with the Examples are Controls included for comparative purposes. As polyvinyl chloride, there was employed "Geon EP-103" (trade name, a product of Nippon Zeon Co., Ltd. 1050 of average degree of polymerization).

DESCRIPTION OF THE PREFERRED EMBODIMENTS

Having now described this invention, the same will be further understood by reference to certain specific examples which are included herein for purposes of illustration only and are not intended to be limiting of the invention of any embodiments thereof.

EXAMPLE 1

A series of stabilizer systems comprising dialkyl tin dilaurate given in Table 2 and the hydroxymercaptan compound shown in Table 1 were respectively added to 100 parts of polyvinyl chloride and 50 parts of dioctyl phthalate plasticizer, and thereafter blended into plasticized polyvinyl chloride sample. The mixture was blended for 5 minutes on a two-roll mill heated to 160° C. and then rolled into sheets having 1 mm. thickness. Each of said sheets was subjected to heat treatment in a Geer's aging tester maintained to 180° C. for evaluation of thermal stability. The results are summarized in Table 2.

Comparative tests under similar conditions were conducted using dialkyl tin dilaurate alone, dibutyl tin mercaptide alone or dioctyl tin s,s'-bis(isooctylmercaptideacetate) (DTIMA) alone as alkyl tin stabilizer and using a mixture of said organo tin sulfur-containing compound and the hydroxymercaptan compound. The results are also shown in Table 2.

As is apparent from the data in Table 2, long-term thermal stability is not sufficient in systems containing dialkyl tin dilaurate alone without hydroxymercaptan compound, while in systems containing dialkyl tin dilaurate with hydroxymercaptan compound, no initial discoloration is recognized and long-term thermal stability may be greatly improved with even a reduction of dialkyl tin dilaurate in amount.

Also, the combination of hydroxymercaptan compound and organo tin sulfur-containing compound such as dibutyl tin mercaptide or dioctyl tin s,s'-bis(isooctylmercaptide acetate) causes almost no appreciable improved effect in thermal stability in comparison with organo tin sulfur-containing stabilizer alone.

EXAMPLE 2

The procedure of Example 1 was repeated using dibutyl tin maleate or dibutyl tin dioctylmaleate in place of dibutyl tin maleate. The results of thermal stability tests are shown in Table 3, which also shows the result of thermal stability tests conducted with dialkyl tin maleate alone as stabilizer.

From the data in Table 3, it is apparent that samples stabilized with the mixture of dialkyl tin maleate stabilizer and hydroxymercaptan compound in accordance with the present invention have considerably greater thermal stability than samples stabilized with dialkyl tin maleate alone. The alkyl tin maleate stabilizer was reduced in amount and yet, rather better long-term thermal stability was achieved.

TABLE 2

| Exp. No. | Alkyl tin stabilizer | Part | Hydroxymercaptan | Part | 20 | 40 | 60 | 80 | 100 | 120 | 140 | 160 |
|---|---|---|---|---|---|---|---|---|---|---|---|---|
| | Stabilizer system | | | | Results of thermal stability test Heated period (min.) | | | | | | | |
| 1 | Dibutyl tin dilaurate | 2.0 | No. 1 | 0.3 | 1 | 1 | 1 | 1 | 1 | 2 | 3 | 3 |
| 2 | Dibutyl tin dilaurate | 1.0 | No. 1 | 0.3 | 1 | 1 | 1 | 1 | 2 | 3 | 3 | 4 |
| 3 | Dibutyl tin dilaurate | 1.0 | No. 3 | 0.5 | 1 | 1 | 1 | 1 | 1 | 2 | 3 | 3 |
| 4 | Dibutyl tin dilaurate | 1.0 | No. 5 | 0.2 | 1 | 1 | 1 | 1 | 2 | 3 | 4 | 4 |
| 5 | Dioctyl tin dilaurate | 2.0 | No. 1 | 0.3 | 1 | 1 | 1 | 1 | 1 | 2 | 2 | 3 |
| 6 | Dioctyl tin dilaurate | 1.0 | No. 1 | 0.3 | 1 | 1 | 1 | 1 | 2 | 2 | 2 | 3 |
| 7 | Dimethyl tin dilaurate | 2.0 | No. 1 | 0.3 | 1 | 1 | 1 | 1 | 1 | 2 | 3 | 3 |
| 8 | Dimethyl tin dilaurate | 1.0 | No. 1 | 0.3 | 1 | 1 | 1 | 1 | 2 | 2 | 3 | 3 |
| Control | Dibutyl tin dilaurate | 2.0 | None | — | 2 | 2 | 3 | 4 | 4 | 4 | 4 | 4 |
| | Dioctyl tin dilaurate | 2.0 | None | — | 2 | 2 | 3 | 3 | 4 | 4 | 4 | 4 |
| | Dioctyl tin dilaurate | 1.0 | None | — | 2 | 3 | 3 | 4 | 4 | 4 | 4 | 4 |
| | Dimethyl tin dilaurate | 2.0 | None | — | 2 | 2 | 3 | 4 | 4 | 4 | 4 | 4 |
| | Dimethyl tin dilaurate | 1.0 | None | — | 2 | 3 | 3 | 4 | 4 | 4 | 4 | 4 |
| | Dibutyl tin mercaptide | 1.0 | No. 1 | 0.5 | 1 | 1 | 1 | 2 | 3 | 4 | 4 | 4 |
| | Dibutyl tin mercaptide | 1.0 | None | — | 1 | 1 | 1 | 2 | 3 | 4 | 4 | 4 |
| | DTIMA | 1.0 | No. 4 | 0.3 | 1 | 1 | 1 | 2 | 2 | 3 | 4 | 4 |
| | DTIMA | 1.0 | None | — | 1 | 1 | 1 | 2 | 3 | 4 | 4 | 4 |

1 colourless
2 slightly yellowish
3 brown
4 dark brown

TABLE 3

| Exp. No. | Alkyl tin stabilizer | Part | Hydroxymercaptan | Part | 20 | 40 | 60 | 80 | 100 | 120 | 140 | 160 |
|---|---|---|---|---|---|---|---|---|---|---|---|---|
| | Stabilizer system | | | | Results of thermal stability test Heated period (min.) | | | | | | | |
| 9 | Dibutyl tin maleate | 2.0 | No. 2 | 0.3 | 1 | 1 | 1 | 1 | 1 | 1 | 1 | 2 |
| 10 | Dibutyl tin maleate | 1.0 | No. 2 | 0.3 | 1 | 1 | 1 | 1 | 1 | 1 | 2 | 2 |
| 11 | Dibutyl tin maleate | 1.0 | No. 1 | 0.2 | 1 | 1 | 1 | 1 | 1 | 2 | 3 | 3 |
| 12 | Dibutyl tin maleate | 1.0 | No. 4 | 0.5 | 1 | 1 | 1 | 1 | 1 | 1 | 1 | 2 |
| 13 | Dibutyl tin dioctylmaleate | 2.0 | No. 1 | 0.3 | 1 | 1 | 1 | 1 | 1 | 1 | 2 | 2 |
| 14 | Dibutyl tin dioctylmaleate | 1.0 | No. 1 | 0.3 | 1 | 1 | 1 | 1 | 1 | 2 | 2 | 2 |
| Control | Dibutyl tin maleate | 2.0 | None | — | 1 | 1 | 1 | 1 | 2 | 3 | 3 | 4 |
| | Dibutyl tin maleate | 1.0 | " | — | 1 | 1 | 1 | 2 | 3 | 3 | 4 | 4 |
| | Dibutyl tin | | | | | | | | | | | |

TABLE 3-continued

| Exp. No. | Stabilizer system | | | | Results of thermal stability test Heated period (min.) | | | | | | | |
|---|---|---|---|---|---|---|---|---|---|---|---|---|
| | Alkyl tin stabilizer | Part | Hydroxymercaptan | Part | 20 | 40 | 60 | 80 | 100 | 120 | 140 | 160 |
| | dioctylmaleate | 2.0 | " | — | 1 | 1 | 1 | 1 | 2 | 2 | 3 | 4 |
| | Dibutyl tin dioctylmaleate | 1.0 | " | — | 1 | 1 | 1 | 2 | 2 | 3 | 4 | 4 |

EXAMPLE 3

The procedure of Example 1 was repeated using dibutyl tin laurate series stabilizer "T-12J" (trade name, a product of KATSUTA KAKO Co.) as dibutyl tin laurate stabilizer. The results of thermal stability tests are shown in Table 4.

For comparison, a similar test was conducted with "T-12J" alone without hydroxymercaptan compound. The result is also shown in Table 4.

Table 4 shows that the hydroxymercaptan markedly improves initial discoloration and long-term thermal stability of dibutyl tin laurate stabilizer.

TABLE 4

| Exp. No. | Stabilizer system | | | | Results of thermal stability test Heated period (min.) | | | | | | | |
|---|---|---|---|---|---|---|---|---|---|---|---|---|
| | Alkyl tin stabilizer | Part | Hydroxymercaptan | Part | 20 | 40 | 60 | 80 | 100 | 120 | 140 | 160 |
| 15 | Commercial product T-12J | 2.0 | No. 3 | 0.3 | 1 | 1 | 1 | 1 | 1 | 2 | 3 | 4 |
| 16 | Commercial product T-12J | 1.0 | No. 3 | 0.3 | 1 | 1 | 1 | 1 | 2 | 3 | 3 | 4 |
| Control | Commercial product T-12J | 2.0 | None | — | 2 | 2 | 2 | 3 | 4 | 4 | 4 | 4 |

What we claim is:

1. A halogen-containing resin composition comprising a halogen-containing resin and organo tetravalent tin stabilizer selected from the group consisting of alkyl tin laurates and alkyl tin maleates and a stabilizer assistant being one of the hydroxymercaptan compounds having the following structural formula No. 1 to No. 5.

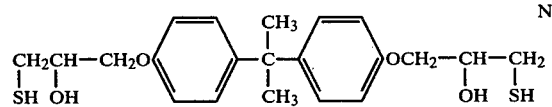

No. 1

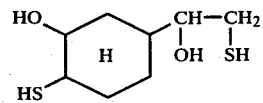

No. 2

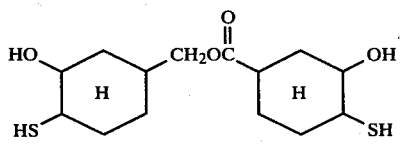

No. 3

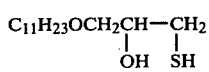

No. 4

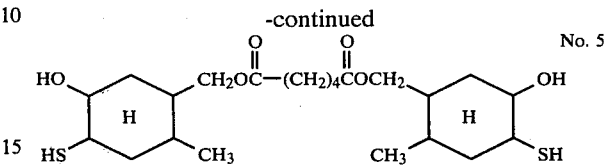

No. 5

2. A composition according to claim 1, wherein the stabilizer is present in an amount of from 0.5 to 5.0 parts by weight per 100 parts by weight of the halogen-containing resin and the stabilizer assistant is present in an amount of from 0.01 to 5.0 parts by weight per 100 parts by weight of the halogen-containing resin.

3. A composition according to claim 1, wherein said organo alkyl tin laurate contains 1 to 8 carbon atoms in the alkyl group and the alkyl tin maleate contains 1 to 8 carbon atoms in the alkyl group.

4. A composition according to claim 1 or 3, wherein said organo tetravalent tin stabilizer is dimethyl tin dilaurate, dibutyl tin dilaurate, dioctyl tin dilaurate, dibutyl tin maleate or dimethyl tin dioctylmaleate.

5. A composition according to claim 1, wherein said stabilizer assistant is 2,2-bis[4-(2-hydroxy-3-mercaptopropoxy)phenyl]propane having the structural formula

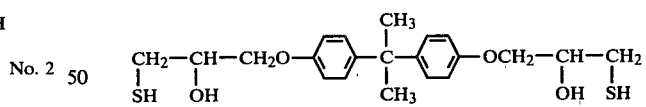

6. A composition according to claim 1, wherein the halogen-containing resin is polyvinyl chloride, polyvinylidene chloride, a copolymer of vinyl chloride or vinylidene chloride with a copolymerizable unsaturated monomer, a chlorinated polyethylene or a chlorinated polypropylene.

7. A composition according to claim 5, wherein said organo tetravalent tin stabilizer is dibutyl tin dilaurate, dioctyl tin dilaurate, dibutyl tin maleate, or dioctyl tin maleate.

* * * * *